Figure 3:
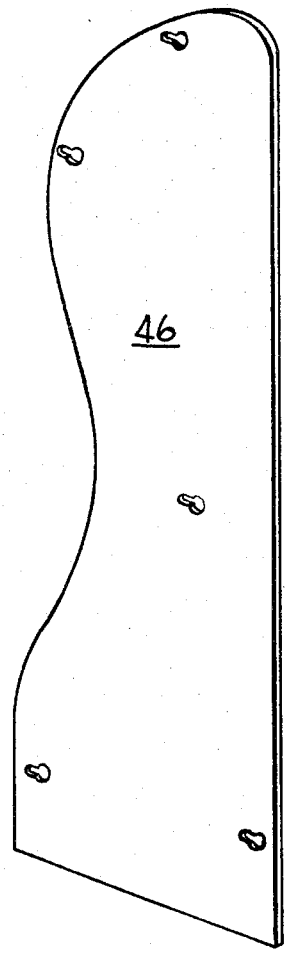

May 7, 1968 P. G. K. SCHROEDER 3,381,359
CASING FASTENING MACHINE
Filed April 8, 1966 2 Sheets-Sheet 1
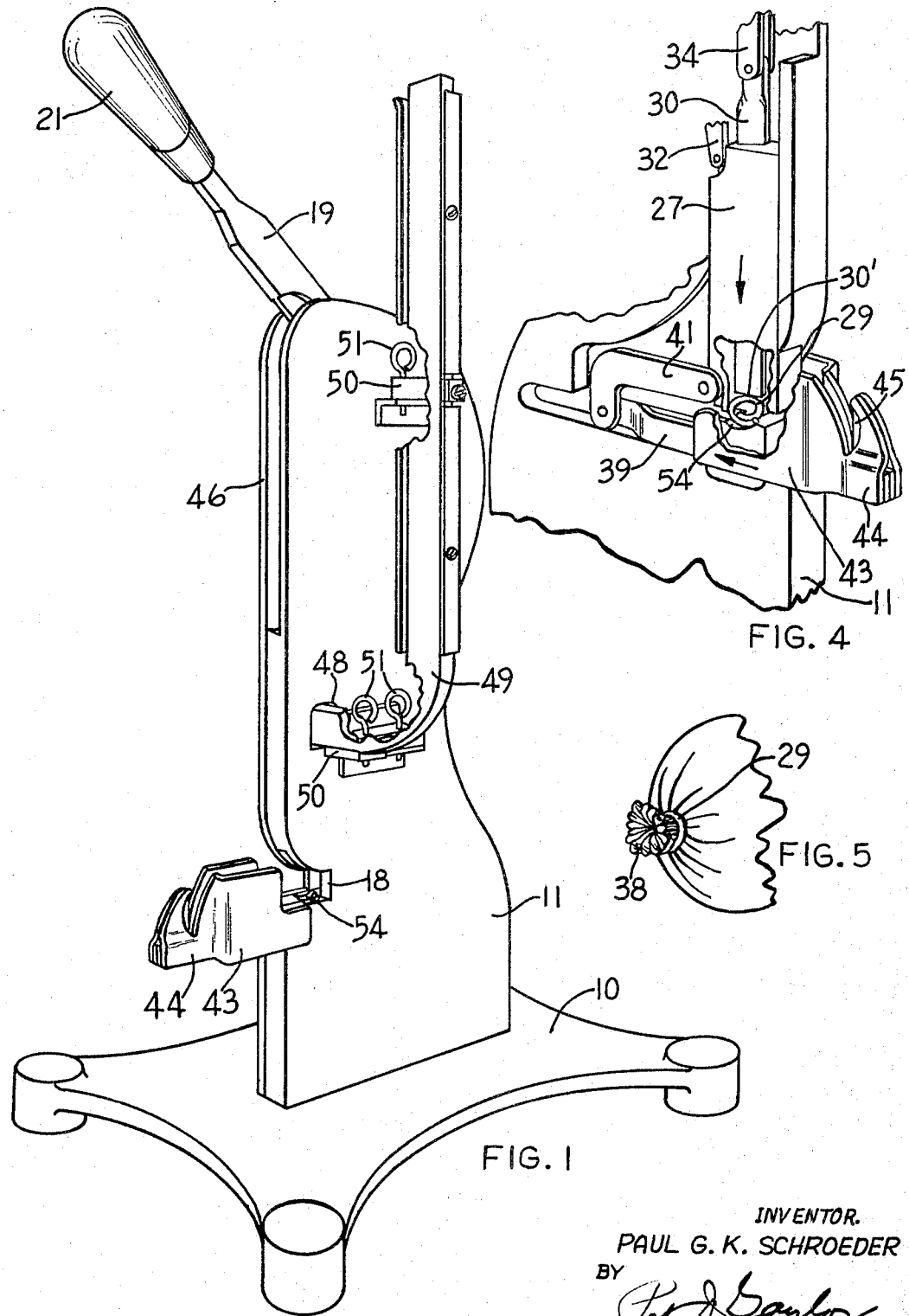
INVENTOR.
PAUL G. K. SCHROEDER
BY
ATTORNEY May 7, 1968

P. G. K. SCHROEDER 3,381,359

CASING FASTENING MACHINE

Filed April 8, 1966

2 Sheets-Sheet 2

INVENTOR.
PAUL G. K. SCHROEDER
BY
ATTORNEY

United States Patent Office 3,381,359
Patented May 7, 1968

3,381,359
CASING FASTENING MACHINE
Paul G. K. Schroeder, 28 Island Trail,
Lake Mohawk, Sparta, N.J. 07871
Filed Apr. 8, 1966, Ser. No. 541,225
3 Claims. (Cl. 29—212)

This invention relates to a machine for fastening open ends of casings, bags, and the like. More specifically, it deals with a casing fastening machine having a novel lever arrangement whereby a lever actuates simultaneously two arms, one of which gathers and compresses the casing end, while the other forces a driver die over a staple-like fastener and crimps said fastener onto the gathered and compressed casing. A cutting attachment, and other novel features are also present.

Various casing fastening machines have been disclosed in the art, some of which are now in commercial use. They involve complex fastening mechanisms, and most of them rely on hand gathering of the casing and on the driver itself, to compress the casing end prior to fastening. In the present invention, a relatively uncomplicated and readily-constructed machine is provided which is light enough to be easily carried in one hand, which contains a very small number of parts, and which is easily maintained.

The invention will be more readily understood by reference to the accompanying drawings in which a preferred embodiment is described and in which the same numerals refer to similar parts.

Figure 2:
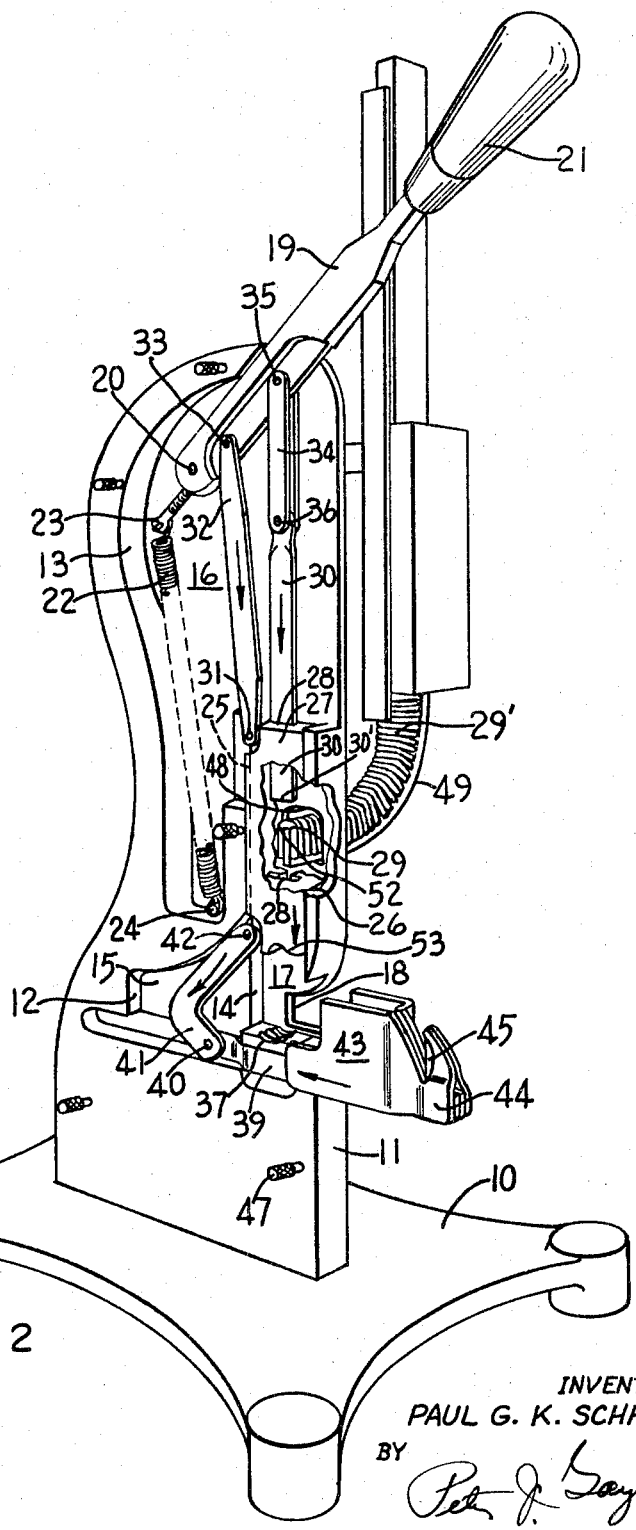

In the drawings,

FIGURE 1 depicts a perspective front and side view of a preferred embodiment of the invention, with portions of the fastener channel cut away to reveal the ready-removal feature thereof. FIGURE 2 presents a similar view of the front and the other side of the machine, with side plate (as shown in FIGURE 3) removed, and lower top portion of the fastener channel removed, to disclose the inner machine mechanism, and with a portion of the runway enclosure cut away to more clearly show the portion of the driver at the time of entry of the fastener. FIGURE 4 illustrates the central portion of the machine mechanism (with a portion of the runway enclosure and gathering arm cut away), after crimping of the fastener (the casing end not being shown). FIGURE 5 shows a casing end as fastened by the machine of the present invention.

Referring again to the drawings, numeral 10 indicates a flat base, preferably of metal, on which is mounted an upright plate frame 11, having milled out portions 12, 13 and 14, in which are disposed most of the moving portions of the machine. The upright 11 may be cast, rather than milled, the purpose being to provide side portions 15, 16 and 17, respectively, which serve to protect the operator from the moving parts on that side. Throat 18 is cut through the side portion 17 to allow entry therein of the casing end to be fastened.

Lever arm 19 is pivoted at 20 to side portion 16, and it is provided with handle 21 for manipulation to fasten the casing ends. The latter, of course, may be substituted by a suitable motor, in conventional manner, if motor-actuation is desired, said motor then being mounted on the upper portion of upright 11. Spring 22 has its one end attached at 23, to the inner end of lever 19, and its other end attached, at 24, to side wall portion 16, in a manner so as to retract lever 21 to idle position after the fastening stroke.

Riding vertically in side grooves 25 and 26 of upright 11, is runway enclosure 27, in which is cut runway channel 28 through which both the fastener 29 and the driver 30 pass. Attached pivotally to the side of enclosure 27, at 31, is the lower end of connecting arm 32, the upper end of which is pivoted, at 33, to the inner portion of lever 19, but pivot 32 is disposed outwardly of lever pivot 20. Also pivoted to the inner portion of lever 19, at 35, but disposed outwardly of arm 32 is connecting arm 34. Its lower end is pivotally connected, at 36, to the upper end of driver 30. The later two connecting arms really serve as laterally-movable linkages between the lever and the connected elements. The end 30' of driver 30 serves as an upper crimping die, and is shaped accordingly.

Disposed on upright 11, to the inner side of and slightly below throat 18, is lower crimping die 37 on which the legs of the fastener 29 fall to circumscribe the gathered and pressed casing end 38 prior to crimping thereon. It is positioned so that the die face is in line with die end 30' of driver 30.

A sliding yoke 39 straddles, laterally, lower die 37. This yoke is pivotally joined at its inner end, at 40, to inwardly-bent arm 41, which is designed to reciprocate laterally the yoke 39. The upper end of arm 41 is pivotally attached, at 42, to the lower portion of enclosure 27. The other end of yoke 39 is connected to gatherer 43. It is thus apparent that when enclosure 27 is pushed down by arm 32, it pushes bent arm 41 inwardly. This pulls yoke 39, and gatherer 43 is pulled against a casing end disposed at throat 18, whereby the gatherer 43 then performs its function of gathering the casing end. The outer end 44 of gatherer 43 is provided with a cutter 45 which may be used to cut off excessive length of casing end. Plate 46 is used to cover the open side of upright 11, by use of screws 47, so as to protect the operator on that side.

A hole 48 is provided in wall portion 17 to enable entry therein of staple fastener 29 from its carrier channel 49. The latter is attached to bosses 50 on the side of upright 11 by means of pins 51, which are readily removable.

It will be noted that the inner portion of enclosure 27 is open, thus making it possible for fastener 29 to slide into position for being driven down runway 28 by driver 30.

When the machine is in idle position, it is in the position as shown in FIGURE 2. Fastener 29 is abutting the inner wall 52 of enclosure 27 due to the pressing and adherence of other fasteners 29'. When a casing end 38 is to be fastened, it is inserted in throat 18, and lever 19 is pushed down via handle 21. This causes driver end 30' to push fastener 29 down through runway 28. Simultaneously, arm 32 pushes down enclosure 27 which, in turn, causes arm 41 to pull inwardly yoke 39 as well as gatherer 43, thus enabling the gathering of the casing end.

When lever 19 is near the end of its downstroke, lower end 53 of enclosure 27 completes the pressing down of the casing end before driver 30 begins crimping the fastener. When the gatherer 43 has completely gathered the casing and enclosure end 53 has completed its pressing down of the casing, driver 30 begins to crimp the fastener which already is circumscribing the casing. The fastener legs are bent toward each other due to the arcuate face 54 of die 37, and the positions of the parts at the end of the downward stroke are as shown in FIGURE 4. When the lever 19 is allowed to rise, casing end 38 is removed in fastened condition, as in FIGURE 5, and the machine then is ready for a repetition of the cycle. Excess casing may be cut off by cutter 45.

I claim:
1. A casing fastening machine for fastening staple-like fasteners onto open casing ends, comprising, in combination:

a base, an upright mounting attached to said base, and having a flat inner face, a throat cut into the forward lower portion of said upright, a fastener-passing opening cut into said upright above said throat, a runway enclosure disposed against the inside of said upright opposite said opening and designed to slide only vertically on said upright, a vertical runway cut in the lower portion of the inner face of said enclosure in a manner such as to enable fasteners entering said opening to be driven down in said runway, a crimping die mounted on the inside of said upright alongside said throat and in line with said runway and designed to enable crimping thereon of a fastener after it has circumscribed said casing, a vertically-actuatable lever pivotally mounted at its inner end to said upright, an arm pivotally mounted at one end on said lever outwardly of said lever pivot and pivotally attached at its other end to said enclosure, a vertically movable laterally-corrected driver arm pivotally connected at one end to said lever adjacent said enclosure arm, and designed so that its other end will pass through said enclosure over a fastener disposable therein and drive said fastener down said runway for crimping said fastener around said casing on said crimping die, spring means connecting the inner end of said lever with said upright and designed to maintain it in upright position, an inwardly-bent arm pivotally connected at its upper end to said enclosure, a gatherer disposed outwardly of said crimping die in line therewith and connected to the lower end of said bent arm in a manner such that when said latter arm is moved inwardly by the downward motion of said enclosure, said gatherer is moved closer toward said die to effect a gathering action upon a casing end disposed in said throat, and a fastener feeder attached to the outer side of said upright and designed to hold a supply of fasteners and to feed them through said opening, said arms being arranged so that as said lever arm is lowered, the bottom of said enclosure compresses said casing end as said gatherer completes gathering same prior to crimping of said fastener on said casing end by said driver.

2. A casing fastening machine according to claim 1 in which a cutter is mounted on the outer end of said gatherer.

3. A casing fastening machine according to claim 1 in which a connecting arm is pivotally disposed between the upper end of said driver and said lever to serve as a lateral correction.

References Cited

UNITED STATES PATENTS 2,880,419    4/1959    Tipper _____ 29—243.57

WILLIAM W. DYER, JR., *Primary Examiner.*

N. ABRAMS, *Assistant Examiner.*